United States Patent
Bamber

(10) Patent No.: US 12,512,227 B2
(45) Date of Patent: Dec. 30, 2025

(54) PLASMA-FACING COMPONENT COOLING

(71) Applicant: Tokamak Energy Ltd, Abingdon (GB)

(72) Inventor: Rob Bamber, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 98 days.

(21) Appl. No.: 18/257,655

(22) PCT Filed: Dec. 20, 2021

(86) PCT No.: PCT/EP2021/086903
§ 371 (c)(1),
(2) Date: Jun. 15, 2023

(87) PCT Pub. No.: WO2022/136324
PCT Pub. Date: Jun. 30, 2022

(65) Prior Publication Data
US 2024/0127972 A1    Apr. 18, 2024

(30) Foreign Application Priority Data
Dec. 21, 2020   (GB) ..................... 2020283

(51) Int. Cl.
*G21B 1/13*       (2006.01)
*F02K 9/64*       (2006.01)
*G21B 1/05*       (2006.01)

(52) U.S. Cl.
CPC .................. *G21B 1/13* (2013.01); *F02K 9/64* (2013.01); *G21B 1/057* (2013.01)

(58) Field of Classification Search
CPC ..................... G21B 1/13; F02K 9/64
See application file for complete search history.

(56) References Cited

U.S. PATENT DOCUMENTS 2,906,494 A * 9/1959 McCarty ................. F01D 5/18
                                                    415/12
3,585,800 A * 6/1971 Kuntz ..................... F02K 9/64
                                                    60/265

(Continued)

FOREIGN PATENT DOCUMENTS

CN      107705823 A      2/2018
CN      109887617 A      6/2019

(Continued)

OTHER PUBLICATIONS

Phani Kumar Domalapally, et al., "Comparison of Schemes for Cooling High Heat Flux Components in Fusion Reactors," Acta Polytechnica 55(2):86-95, 2015. (Year: 2015).*

(Continued)

*Primary Examiner* — David P. Olynick
(74) *Attorney, Agent, or Firm* — Michael Best & Friedrich LLP

(57) ABSTRACT

A plasma-facing component for a plasma chamber, comprising: a plasma-facing target surface; an inlet through which to receive a coolant fluid and an outlet through which to expel the coolant fluid; and a plurality of internal cooling channels. Each cooling channel is connected to the inlet by a plurality of feed channels and to the outlet by a plurality of return channels, the feed channels being configured to direct coolant fluid against a region of a wall of the cooling channel. Respective openings of the feed and return channels into the cooling channel are arranged in non-overlapping repeating units along a length of the cooling channel Each unit comprises openings of at least one feed channel and at least one return channel.

27 Claims, 3 Drawing Sheets

(56) References Cited

U.S. PATENT DOCUMENTS

| | | | | | |
|---|---|---|---|---|---|
| 4,190,398 | A | * | 2/1980 | Corsmeier | F01D 5/18 415/114 |
| 5,410,574 | A | | 4/1995 | Masumoto et al. | |
| 5,583,895 | A | * | 12/1996 | Filipuzzi | G21B 1/13 376/150 |
| 5,941,687 | A | * | 8/1999 | Tubbs | F01D 5/18 416/97 R |
| 2002/0018715 | A1 | | 2/2002 | Dailey | F01D 5/187 416/1 |
| 2002/0172316 | A1 | * | 11/2002 | Matera | G21B 1/11 376/134 |
| 2007/0246517 | A1 | * | 10/2007 | Schedler | G21B 1/13 428/665 |
| 2017/0032851 | A1 | * | 2/2017 | Sykes | H05H 1/12 |
| 2018/0087443 | A1 | * | 3/2018 | Adriany | F02K 9/64 |

FOREIGN PATENT DOCUMENTS

| | | |
|---|---|---|
| CN | 108335759 B | 11/2019 |
| CN | 108615563 B | 5/2020 |
| CN | 111415761 A | 7/2020 |
| EP | 2849184 A2 | 3/2015 |
| JP | S60157073 A | 8/1985 |
| JP | H04355394 A | 12/1992 |
| JP | 2000241579 A | 9/2000 |
| KR | 1020160130962 A | 11/2016 |
| RU | 2179340 C2 | 2/2002 |
| RU | 2182984 C2 | 5/2002 |
| RU | 2649854 C1 | 4/2018 |
| RU | 2682962 C1 | 3/2019 |
| WO | 2019229415 A1 | 12/2019 |

OTHER PUBLICATIONS

P. Norajitra, et al., "European development of He-cooled divertors for fusion power plants," Nucl. Fusion 45 (2005) 1271-1276. (Year: 2005).*

Qixin Ling, et al. "A research and development review of water-cooled breeding blanket for fusion reactors," Annals of Nuclear Energy 145 (2020) 107541. (Year: 2020).*

Ziqiang He, et al. "Thermal management and temperature uniformity enhancement of electronic devices by micro heat sinks: A review," Energy 216 (2021) 119223. (Year: 2021).*

Mary F. Wadel, "Comparison of High Aspect Ratio Cooling Channel Designs for a Rocket Combustion Chamber With Development of an Optimized Design," NASA/TM 1998-206313. (Year: 1998).*

Alessandro Tassone, et al. "Recent progress in the WCLL breeding blanket design for the DEMO fusion reactor," IEEE Transactions on Plasma Science, 2018, 46.5: 1446-1457. (Year: 2018).*

Songlin Liu, "Updated design of water-cooled breeder blanket for CFETR," Fusion Engineering and Design 146 (2019) 1716-1720. (Year: 2019).*

International Search Report and Written Opinion for Application No. PCT/EP2021/086903 dated Mar. 24, 2022 (13 pages).

Russian Patent Office Search Report for Application No. 2023119133/07 dated Apr. 3, 2025 (6 pages including English machine translation).

Raffray et al., "Design and material issues for high performance SiCf/SiC-based fusion power cores", Fusion Engineering and Design, vol. 55, No. 1, 2001, pp. 55-95, Section 2.3.2.1 and figure 8 most relevant (41 pages).

Muller et al., "Additive manufacturing of pure tungsten by means of selective laser beam melting with substrate preheating temperatures up to 1000 . C", vol. 19, May 2019, pp. 184-188 (6 pages).

You, "A review on two previous divertor target concepts for DEMO: mutual impact between structural design requirements and materials performance", Nuclear Fusion, vol. 55, No. 11 published Oct. 5, 2015 (13 pages).

United Kingdom Intellectual Property Office Action for Application No. 2020283.4 dated Apr. 20, 2021 (4 pages).

Chinese Patent Office Action for Application No. 202180086357.4 dated Jul. 24, 2025 (12 pages including English machine translation).

Japanese Patent Office Action for Applciation No. 2023537352 dated Oct. 28, 2025 (9 pages including English machine translation).

* cited by examiner

PLASMA-FACING COMPONENT COOLING

CROSS-REFERENCE TO RELATED APPLICATION(S)

This application is a national phase entry of PCT/EP2021/086903, filed on Dec. 20, 2021, which claims priority to GB 2020283.4, filed on Dec. 21, 2020, the entire contents of each of which are incorporated herein by reference.

TECHNICAL FIELD

The invention relates to cooling plasma-facing components used in plasma chambers such as a tokamak plasma chamber. In particular, but not exclusively, the invention relates to cooling components that are used in plasma chambers to remove waste material and heat from a plasma, such as divertors and/or limiters. The invention may also be used in a beam dump for absorbing energy from a beam of photons and/or charged particles, or in a rocket engine.

BACKGROUND

A divertor is a device that allows waste material and heat to be removed from a plasma confined within a plasma chamber, such as a tokamak plasma chamber. In the case of a tokamak, plasmas are typically confined at very high temperatures using magnetic fields. However, during operation of the tokamak, particles slowly and randomly diffuse out of the plasma, and eventually impact on walls of the plasma chamber, thereby transferring considerable amounts of heat to them and causing heavier ions to be ejected from the walls into the plasma. To minimise this problem, particles that would otherwise escape the plasma can be purposefully directed on to a plasma-facing surface of the divertor. When this happens a very high heat flux is applied to the divertor. It is therefore essential that the divertor is cooled efficiently.

A poloidal cross section through one side of an exemplary tokamak is illustrated in FIG. 1. The tokamak 100 comprises a toroidal plasma chamber 101. Poloidal magnetic field coils produce a poloidal magnetic field to confine the plasma, which circulates around a central column of the tokamak. If there were no collisions between plasma particles, turbulence, waves or other such phenomena, then the plasma (made from charged particles) would effectively be "tied" to magnetic field lines, which are represented in FIG. 1 as lines of constant poloidal flux 113. Inside the plasma "core", the plasma is said to be confined onto lines of constant poloidal flux because the lines of constant flux are closed, so called "closed flux surfaces". However, through collisions and other such processes, the particles in the plasma slowly diffuse out of the plasma core. The "last closed flux surface" 111 has a null point 112 at one end (usually the lower end) that defines the edge of the confined core. Flux lines 114 immediately outside the plasma core (the "scrape off layer") intersect two surfaces below the null point 112: an outboard (i.e. radially outer) divertor surface 121 (located in this example at the bottom of a channel in the lower part of the plasma chamber), and an inboard (i.e. radially inner) divertor surface 122. Waste particles and thermal energy are deposited onto these surfaces, with the majority of the waste particles and thermal energy landing on the outboard divertor surface (the exact split between inboard and outboard depends on turbulent physics within the scrape off layer). The divertor surfaces are constructed from elements having relatively low atomic numbers (to avoid contaminating the plasma with high atomic number ions through sputtering and other such erosion processes) which are metals. Suitable metals include tungsten, molybdenum, beryllium, lead-lithium or lithium. The highest heat loads within a tokamak occur at the divertor surfaces 121, 122, and may typically exceed 10 MW per square metre.

Previous ideas for cooling divertors are described in J H You "*A review on two previous divertor target concepts for DEMO: Mutual impact between structural design requirements and materials performance*" (https://doi.org/10.1088/0029-5515/55/11/113026). They include: flowing water through a cooling tube made of a copper, chromium and zinc alloy that passes through blocks of tungsten; and the use of helium cooled "multi-jet impingement modular fingers" in which jets of pressurised helium are directed at a the interior surface of a thimble structure embedded in a tungsten tile.

Another plasma-facing component that may be used for removing charged particles from a plasma is a so-called limiter, which provides a plasma-facing target surface inside the plasma chamber that limits the extent of the plasma along a particular (e.g. radial) direction.

SUMMARY

According to a first aspect of the present invention, there is provided a plasma-facing component for a plasma chamber. The plasma-facing component comprises a plasma-facing target surface; an inlet through which to receive a coolant fluid and an outlet through which to expel the coolant fluid; and a plurality of internal cooling channels. Each cooling channel is connected to the inlet by a plurality of feed channels and to the outlet by a plurality of return channels. The feed channels are each configured to direct coolant fluid against a region of a wall of the cooling channel. Respective openings of the feed and return channels into the cooling channel are arranged in non-overlapping repeating units along a length of the cooling channel, each unit comprising openings of at least one feed channel and at least one return channel.

The arrangement of the openings of the feed and return channels provides fluid flow conditions for the coolant fluid that allow heat to be transferred to the coolant fluid efficiently along the length of the cooling channel. The repeating units may be pairs of the feed and return channel openings such that openings alternate between feed and return channel openings in succession (i.e. feed, return, feed, return . . . etc.). Any number of the repeating units may be provided along the length of each cooling channel, e.g. more than 10 units, or more than a 50 units or more than 100 units.

The repeating units may be pairs of the feed and return channel openings.

The spacing along the length of the cooling channel between the openings of successive feed channels may be from 1.0 mm to 5.0 mm, preferably from 2.0 mm to 4.0 mm.

A spacing along the length of the cooling channel between the openings of adjacent feed and return channels may be from 0.50 mm to 2.00 mm.

Each of the feed channels and/or the return channels may comprise a straight portion that joins the cooling channel at a right angle.

The coolant fluid may be directed on to the region of the wall of each cooling channel from another region of the cooling channel opposite the region.

The region of the wall of each of the cooling channels onto which the coolant fluid is directed may be provided on a side of the cooling channel adjacent to the target surface.

Each cooling channel may have a width or diameter that is greater than a width or diameter of the corresponding feed and/or return channels.

The respective feed channels or the respective return channels for each of the cooling channels may be co-planar with one another.

The length of each cooling channel may extend parallel to the target surface. The cooling channels may be parallel to one another.

The component may comprise a plurality of stacked layers, each of the cooling channels extending continuously through the layers, each layer comprising respective feed channels and/or return channels for each of the cooling channels.

The plasma-facing target surface may be provided by edges of the stacked layers. Alternatively, the plasma-facing target surface may provided as a layer extending across edges of the stacked layers.

The feed channels and/or return channels of each layer may be provided as grooves extending into the layer and another layer adjacent the layer extends across the grooves to seal them.

The feed channels and/or return channels of each layer may be provided as through holes that extend through the layer and respective other layers on either side of the layer extends across the through holes to seal them.

The inlet and the outlet may be provided as channels extending through each of the layers.

The cooling channels and the feed and return channels of each layer may be provided in one of two arrangements that are mirror images of each other.

The plates may each have a thickness in a range from 1 mm to 5 mm, preferably from 1 mm to 2 mm. Each of the cooling channels may have a width or diameter in a range from 0.50 mm to 3.00 mm, preferably from 1.00 mm to 2.00 mm. Each of the feed and/or return channels has a width or diameter in a range from 0.20 mm to 1.50 mm, preferably from 0.60 mm to 1.40 mm.

Each of the layers may be a plate made of one or more metals or alloys, although preferably a single metal or a single alloy is used per plate. In one embodiment, each of the plates is made of the same metal or alloy, e.g. tungsten or molybdenum. Opposing faces of the plates may be bonded together by direct bonding. Alternatively, the component may be provided as a monolithic part made of a single metal or alloy.

The or each metal or alloy may have a melting point greater than 1850 degrees Celsius, preferably greater than 2200 degrees Celsius.

According to a second aspect of the present invention, there is provided a method of manufacturing a component for a plasma chamber, the method comprising controlling an additive manufacturing apparatus to manufacture the component according to the first aspect.

According to a third aspect of the present invention, there is provided a computer program comprising computer executable instructions that, when executed by a processor, cause the processor to control a manufacturing apparatus (e.g. an additive manufacturing apparatus) to manufacture the plasma-facing component according to the first aspect.

According to a fourth aspect of the present invention, there is provided a tokamak plasma chamber comprising a plasma-facing component according to the first aspect.

According to a fifth aspect of the present invention, there is provided a method of removing heat and/or waste products during operation of a plasma chamber according to the fourth aspect. The method comprises:

- magnetically confining a plasma within the tokamak plasma chamber;
- directing ions from the plasma onto the target surface of the plasma-facing component; and
- cooling the component by flowing coolant fluid through the plasma-facing component, between the inlet and the outlet.

The plasma-facing component of any of the above aspects may, for example, be a divertor or a limiter. For example, the limiter may extend into the plasma chamber from the walls of the plasma chamber to limit the extent of a plasma along a particular direction, such as a radial direction). The component of any of the above aspects may also be (or form part of) a plasma-facing first wall structure (or "blanket") for covering internal surfaces of a plasma chamber. For example, the component may be tile or panel which forms part of a plasma-facing first wall (preferably in combination with a plurality of like tiles or panels to form the plasma-facing first wall).

According to a sixth aspect of the present invention there is provided a beam dump for absorbing energy from a beam of photons (e.g. a laser beam) and/or charged particles (e.g. a beam produced by a charge particle accelerator, such as a LINAC or synchrotron). The beam dump comprises: a beam-facing target surface for receiving the beam; and an inlet through which to receive a coolant fluid and an outlet through which to expel the coolant fluid. The beam dump also comprises a plurality of internal cooling channels, each cooling channel being connected to the inlet by a plurality of feed channels and to the outlet by a plurality of return channels, the feed channels being configured to direct coolant fluid against a region of a wall of the cooling channel, respective openings of the feed and return channels into the cooling channel being arranged in non-overlapping repeating units along a length of the cooling channel, each unit comprising openings of at least one feed channel and at least one return channel.

According to a seventh aspect of the present invention there is provided a rocket engine Comprising internal walls defining a combustion chamber for the combustion of a propellant; and a nozzle through which to expel exhaust gases from the combustion chamber. The rocket engine further comprises an inlet through which to receive a coolant fluid and an outlet through which to expel the coolant fluid; and a plurality of internal cooling channels for cooling the walls defining the combustion chamber and/or the nozzle, each cooling channel being connected to the inlet by a plurality of feed channels and to the outlet by a plurality of return channels, the feed channels being configured to direct coolant fluid against a region of a wall of the cooling channel, respective openings of the feed and return channels into the cooling channel being arranged in non-overlapping repeating units along a length of the cooling channel, each unit comprising openings of at least one feed channel and at least one return channel.

The sixth and seventh aspects may include the optional features mentioned above for the first aspect, with the beam dump or rocket engine substituted for the plasma-facing component. For example, the beam dump or rocket engine may comprise a plurality of stacked layers, each of the cooling channels extending continuously through the layers, each layer comprising respective feed channels and/or return channels for each of the cooling channels.

DETAILED DESCRIPTION

When a coolant fluid flows past a surface its flow velocity very near to the surface is very small, such that the fluid flow relative to the surface is typically described as having a "no-slip" boundary condition (i.e. effectively zero flow velocity at the surface). The fluid moving adjacent to the surface forms a slowly moving "boundary layer". Laminar flow within the boundary layer reduces how efficiently heat from the surface can conducted away by the coolant fluid. In some circumstances, more effective heat transfer from the surface can be achieved by "jet impingement" in which a high pressure jet of the coolant fluid is directed against the surface being cooled. The present disclosure provides an arrangement that uses jet impingement in combination with flow along cooling channels to cool a very large surface area within a divertor. In particular, a plurality of "micro-channels" are formed within the body of the divertor and along the length of each microchannel there is provided an array of feed channels that open into the microchannel and which are used to direct a jet of coolant fluid against an internal wall of the microchannel. Coolant fluid that has been heated by contact with the internal wall(s) of the microchannel is then removed from the microchannel by an array of return channels. The feed and return channels are arranged along the length of the microchannel in an alternating pattern or sequence, e.g. a sequence consisting of alternate feed and return channel openings along the length of the microchannel. Such arrangements allow a high density of jets to be formed within each of the micro-channels, which can provide fluid flow conditions that allow heat to be transferred to the coolant fluid efficiently. The fluid flow conditions may include bulk fluid flow along the channel in combination with the fluid flow created by jet impingement. In some circumstances, jet impingement may improve the cooling efficiency by disrupting the boundary layer associated with flow of the coolant fluid along the microchannel.

Figure 2A:
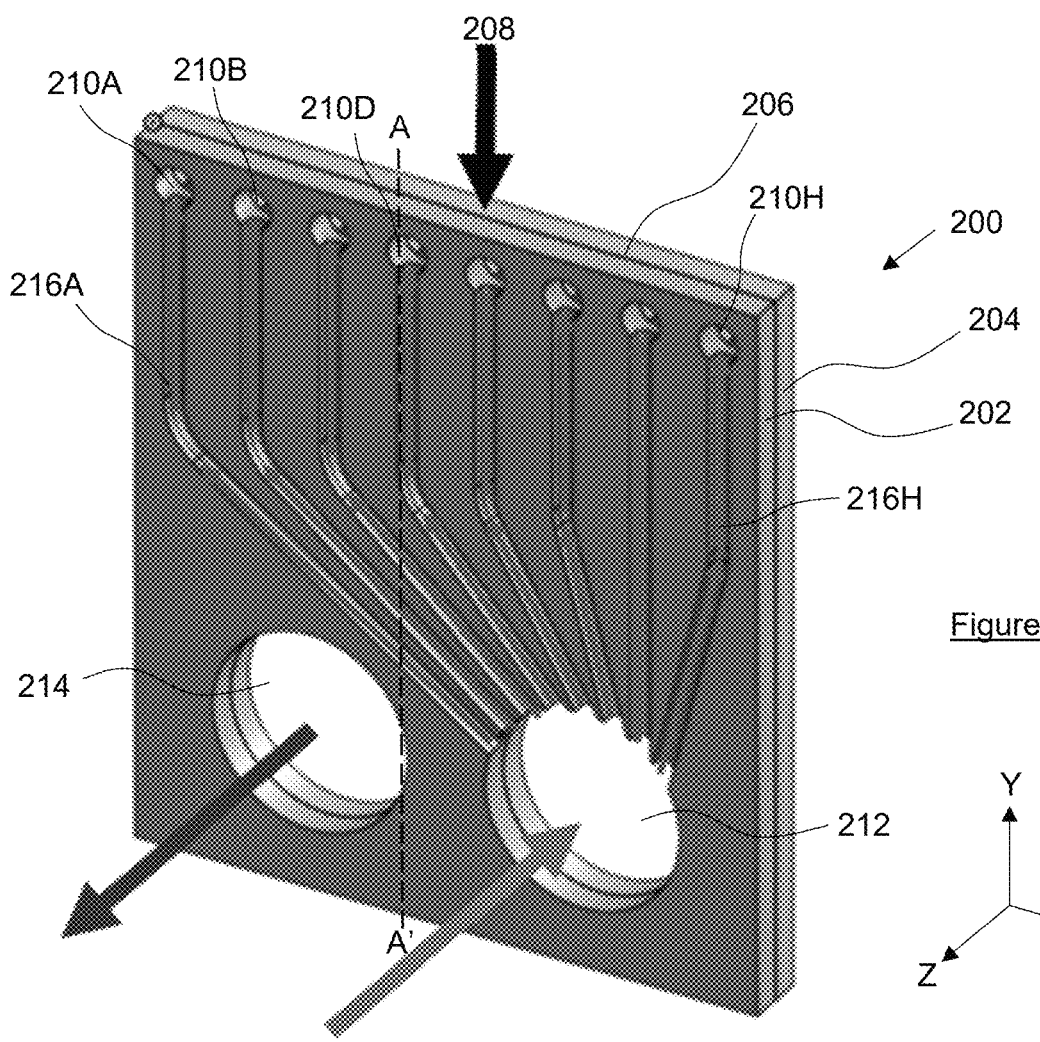
FIG. 2A is a schematic isometric view of a section of a divertor according to the present invention.
Figure 2B:
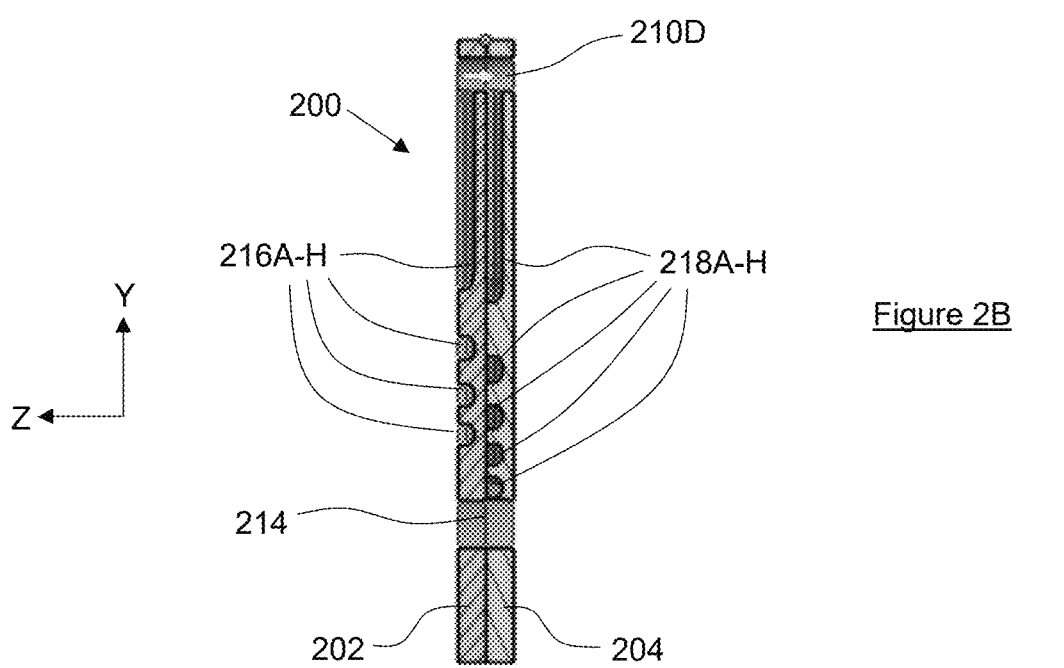
FIG. 2B is a schematic cross section side view of the section of the divertor taken along the line A-A' of FIG. 2A.

FIGS. 2A and 2B show a section of a divertor 200 formed from a stack of plates 202, 204. Although only a first 200 and second 204 of the plates is shown in the figures, the divertor 200 comprises multiple such plates stacked face-to-face one after the other i.e. the first and second plates 200, 204 together form a "unit cell" that is repeated along the Z direction indicated in FIG. 2A. The first and second plates 202, 204 are shown individually in FIGS. 2C and 2D for clarity.

The uppermost surface of the divertor 200 in FIG. 2A is a target surface 206 that receives the ion and heat flux 208 (along the Y direction) that escapes from the plasma when the divertor 200 is being used. Beneath the target surface 206 is a plurality of cooling channels 210A-H, in this case eight cooling channels 210A-H, that extend through the divertor 200 in a direction perpendicular to the target surface 206, i.e. parallel to the direction along which the plates 202, 204 are stacked, in this case along the Z-direction. The cooling channels 210A-H are arranged in a line parallel to the target surface 206 and equally spaced apart from one another and each at the same depth with respect to the target surface 206.

This arrangement allows a high-density of cooling channels 210A-H to be provided close to the target surface 206. Other arrangements of cooling channels 210A-H can also be used, e.g. the cooling channels may be arranged with different depths relative to the target surface 210A-H, such as in a close packed or honeycomb configuration comprising multiple layers of cooling channels 210A-H, to increase the density of cooling channels 210A-H provided near to the surface 206.

The divertor 200 also comprises an inlet channel 212 and an outlet channel 214 that extend through each of the stacked plates 202, 204. In use, coolant fluid (e.g. helium gas) is provided to inlet channel 212 under pressure and is then transferred to each of the cooling channels 210A-H through a plurality of feed channels 216A-H that each extends within the first plate 202 from the inlet channel 212 to one of the plurality of cooling channels 210A-H. The size (e.g. diameter) of the inlet channel 212 is larger than the size of each of the feed channels 216A-H, so that the inlet channel 212 can provide coolant fluid to a large number of feed channels 216A-H simultaneously. The feed channels 216A-H are angularly spaced around the inlet channel 212 (i.e. they "fan out" from the inlet channel 212) in order to reach the cooling channels 210A-H that are further away from the inlet channel 212. In this case, the feed channels 216A-H are generally spaced apart from one another to maximise the thickness of the walls between them. Other arrangements can, however, be used depending on the circumstances. For example, one or more feed channel 216A-H may branch off from another of the feed channels 216A-H. In the present case, the feed channels 216A-H each have a straight section extending away from its respective cooling channel 210A-H at right angles, with the straight sections of each of the channels 216A-H being aligned parallel to one another. The coolant gas is directed across the cooling channel 210A-H and impinges on a side of the cooling channel 210A-H that is nearest to the target surface 206 as this is, in general, the hottest side of the cooling channel 210A-H. The pressure of the coolant fluid supplied to the inlet channel 212 is generally chosen so that the coolant fluid is directed into the cooling channel 210A-H as a jet. Although FIGS. 2A and 2B show each cooling channel 210A-H having a single feed channel 216A-H and return channel 218A-H, it will be appreciated that more than two plates 202, 204 are used in practice, so that each cooling channel 210A-H has multiple pairs of feed channels 216A-H and return channels 218A-H along its length.

Figure 2C:
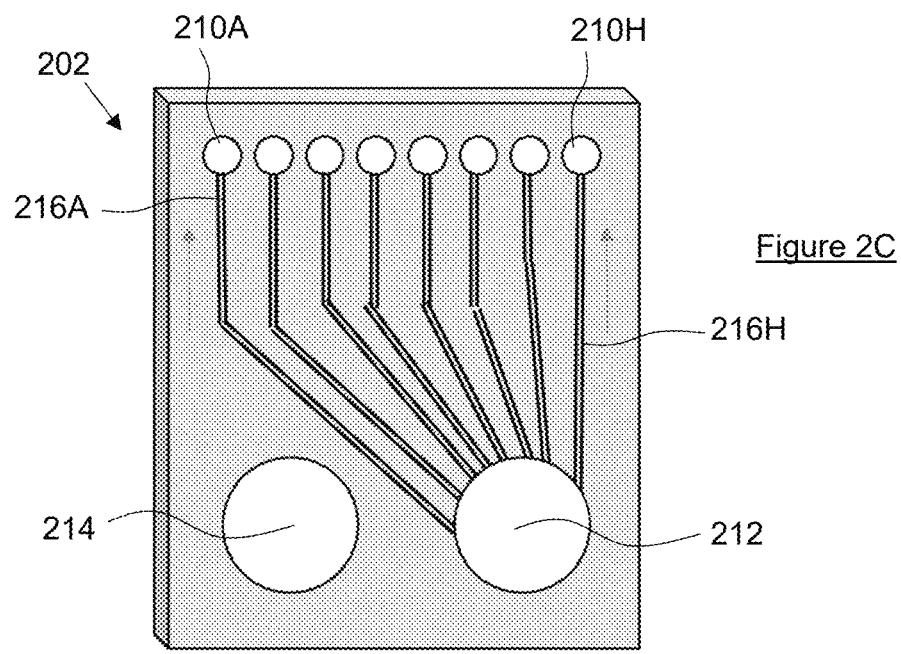
FIGS. 2C and 2D are schematic perspective views of metal plates that may be bonded together to form the section of the divertor shown in FIGS. 2A and 2B.
Figure 2D:
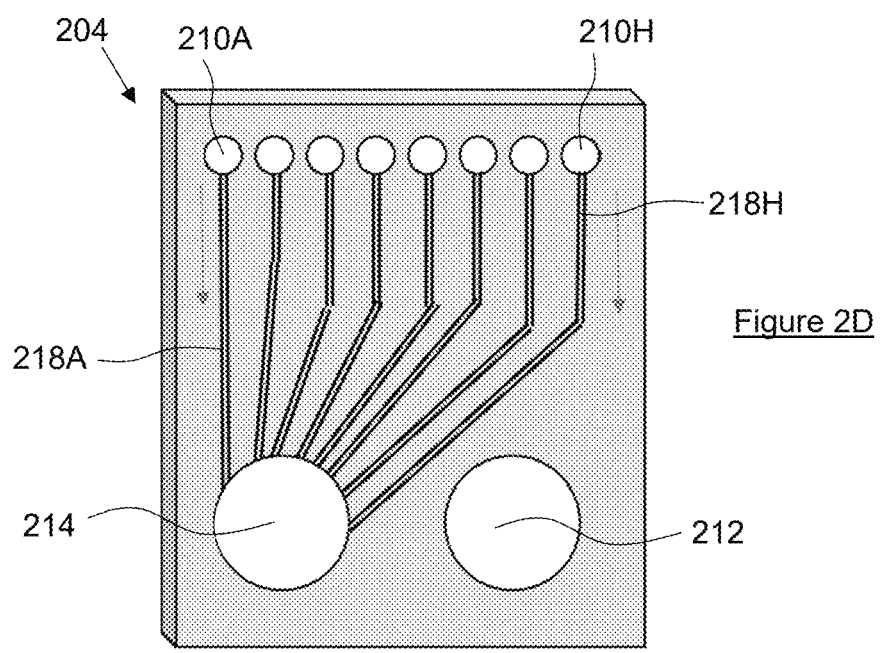

As shown in FIGS. 2C and 2D, the second plate 204 (FIG. 2D) is a mirror image of the first plate (FIG. 2C) in the YZ plane, which simplifies the manufacture of the divertor 200. The second plate 204 comprises a plurality of return channels 218 configured to return the coolant fluid from each of the cooling channels 210A-H to the outlet channel 214, which is at a lower pressure than the inlet channel 212 such that there is a net flow of coolant fluid from the inlet channel 212 through the feed channels 216A-H to the cooling channels 210A-H and from the cooling channels 210A-H through the return channels 218A-H to the outlet channel 214.

As can be seen most clearly in FIG. 2B, the feed channels 216A-H are provided as open channels (i.e. trenches or grooves) in a face of the second plate 204 and are closed (i.e. covered over) by the face of the first plate 202 that contacts the face of the second plate 204. This arrangement allows the divertor 200 to be manufactured more easily as the feed and return channels 216A-H, 218A-H can be provided by removing material from one face of each of the plates 202, 204, e.g. by etching or milling. In addition, as the return channels 218A-H are spaced apart from the feed channels 216A-H by only a small amount in a direction parallel to the cooling channel 218A-H (in this case the Z-direction), coolant fluid entering the cooling channel 210A-H from a feed channel 216A-H only has to travel a short distance along the cooling channel 210A-H before it can be removed from the cooling channel 210A-H via a return channel 218A-H, which ensures a rapid turnover of coolant fluid in the cooling channels 210A-H following jet impingement. In the present example, the spacing between the feed 216A-H and the return 218A-H channels in each of the cooling channels 210A-H may be from 0.50 mm to 2.00 mm.

The spacing between the openings of successive feed channels 216A-H in each of the cooling channels 210A-H may, in this example, be from 1.0 mm to 5.0 mm, or more preferably from 2.0 mm to 4.0 mm. This spacing may allow a high density of jets to be formed along the length of the cooling channel, whilst still providing sufficient space for the return channels to be provided between the feed channels.

The plates 202, 204 may each comprise only feed channels 210A-H or return channels 216 A-H, as shown in FIGS. 2C and 2D. However, in other embodiments, each of the plates 202, 204 may comprise one or more feed channels 210A-H and one or more return channels 216A-H, which may help to reduce temperature differences between different plates 202, 204.

In the present example, the cooling channels 210A-H have a diameter of 1 mm, whilst the inlet and outlet channels 212, 124 have a diameter of 5 mm, but the size of any of the channels can of course be varied according to need. The diameters of the feed and return channels 216A-H, 218A-H are preferably smaller than the diameter of the cooling channels 210A-H, in this case 0.20 mm, which helps to create the jets of coolant fluid. When the coolant fluid is a gas, expansion of the gas from the feed channels 216A-H into the cooling channels 210A-H may provide an additional cooling effect. Although the various channels are generally of circular cross section, any (or all) of them may alternatively have a cross section that is rectangular or of any other shape.

The number of first and second plates 202, 204 that can be used to form the divertor 200, is essentially limited only by the thickness of each plate, the size of the target surface that is required and the pressure drop that occurs during distribution in the inlet and outlet channels 212, 214. For example, if each plate 202, 204 is 1.6 mm thick then a divertor that is around 30 cm in length would require around 188 plates. In general, the thickness of the plates may be from 1 mm to 5 mm to ensure that a high density of jets are created in each cooling channel 210A-H.

The plates 202, 204 may be made from a refractory metal such as tungsten, rhenium, tantalum, molybdenum, niobium and zirconium (or alloys comprising one or more of these metals). In this case, the edges of the plates 202, 204 may provide the plasma-facing target surface. Alternatively, the plates 202, 204 may be made from a more thermally conductive material such as copper or a copper containing alloy comprising copper, chromium and zirconium (CuCrZr). In this case, the plasma-facing target surface may be formed as a separate part or tile made of a refractory metal, such as tungsten, which is bonded to the plates 202, 204 above the cooling channels 210A-H. Optionally, an interlayer comprising copper and tungsten (for example) may be provided between the plates 202, 204 and the part or tile comprising the target surface in order to provide better matching of the coefficients of expansion across the joints between the different materials.

The various channels in the plates 202, 204 may be formed in a number of ways, such as etching or machining. The plates are bonded together using a direct bonding technique, such as diffusion bonding, e.g. Hot Isostatic Pressing. Direct bonding as used here means that no intermediate layer (such as solder) is provided between the plates to bond them together, i.e. the metal surfaces of the plates are bonded directly to one another. Other techniques such as brazing or welding, (e.g. explosion welding) can also be used. Although the feed and return channels 216A-H, 218A-H are shown in FIGS. 2A-2D as extending only part of the way into each plate 202, 204 (i.e. as grooves), in other examples they may extend all the way through (i.e. as through holes) for some or all of the plates 202, 204 (provided that the feed and return channels 216A-H, 218A-H remain separate). This can be achieved by, for example, offsetting the feed and return channels 216A-H from one another along the Y-direction. Offsetting the feed and return channels 216A-H in this manner (regardless of whether they are grooves and/or through holes) may also help avoid the return channels 218A-H from heating the feed channels 216A-H, which may otherwise reduce the ability of the coolant fluid to cool the target surface 206.

The divertor may also be manufactured as a monolithic part made from a refractory metal or alloy, e.g. using an additive manufacturing technique. For example, the divertor may be manufactured by using a high powered laser to selectively melt tungsten powder to build up the required geometry layer by layer. Such a technique is described by Müller et al. 2019, *"Additive manufacturing of pure tungsten by means of selective laser beam melting with substrate preheating temperatures up to 1000° C."* (https://doi.org/10.1016/j.nme.2019.02.034). Manufacturing the divertor as a single piece of a refractory metal (such as tungsten) is particularly advantageous because it avoids the need to form a joint between a plasma-facing part of the divertor (and hence reduces issues associated with stresses induced in joints), and the rest of the divertor, (i.e. the part of the divertor containing the various channels). The relatively small size of the channels also means that the mechanical stresses arising from the internal pressure of the divertor are kept low, which helps to reduce the likelihood of damage or degradation when the divertor is used, which is particularly important for applications where servicing or repair of the divertor may lead to significant down time and be hazardous for workers. It will be appreciated that plasma-facing components other than a divertor, such as limiters, can also be manufactured as a monolithic part made from a refractory metal or alloy in a similar manner.

The structure of the divertor (or other plasma-facing component, such as a limiter) may be represented digitally in the form of a design file. A design file, or computer aided design (CAD) file, is a configuration file that encodes one or more of the surface or volumetric configuration of the shape of a product. In the case, the design file represents the geometrical arrangement or shape of the divertor (or other plasma-facing component). Once obtained, a design file may be converted into a set of computer executable instructions that, once executed by a processer, cause the processor to control a manufacturing apparatus (e.g. an additive manufacturing apparatus) to produce the divertor according to the geometrical arrangement specified in the design file. Accordingly, by controlling a manufacturing apparatus according to the computer executable instructions, the manufacturing apparatus can be instructed to "print out" the divertor (or other plasma-facing component).

Figure 1:
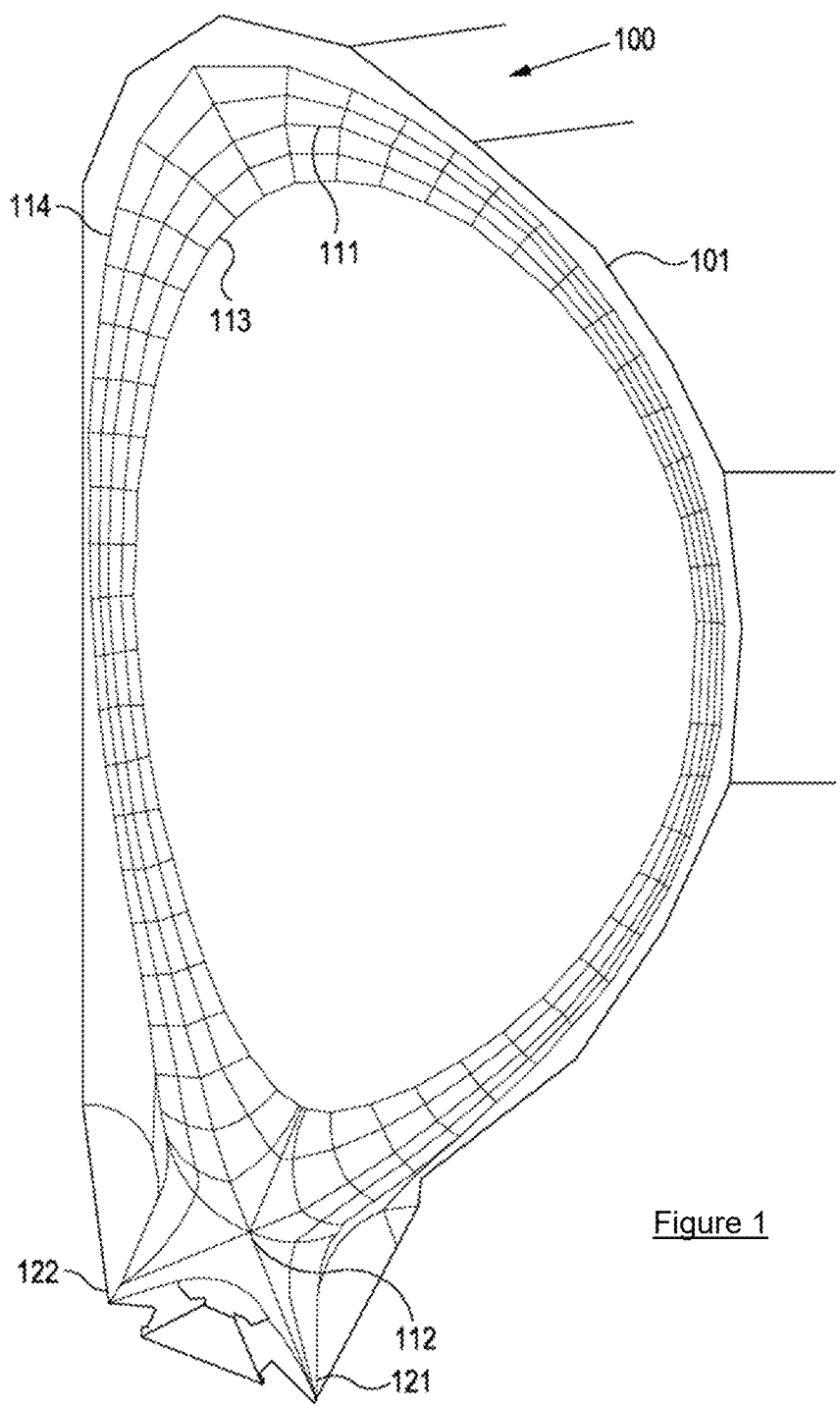
FIG. 1 is a schematic poloidal cross section of a tokamak having a single-null divertor.

Referring again to FIG. 1, the tokamak 100 may comprise one or more of the above-described divertors, such as divertor 200, with the target surface 206 providing one or both of the divertor surfaces 121, 122 indicated in the Figure. In use, a supply of coolant fluid is connected to the inlet 212 of the divertor 200 and the outlet 214 is preferably connected to a separate cooling unit which cools the coolant fluid after it has been heated by the divertor 200 and returns cooled coolant fluid back to the inlet 212, i.e. a closed loop cooling circuit is created. The coolant fluid may be a liquid or a gas, preferably an inert gas such as helium. A gas is preferable in many cases to avoid safety issues that might arise from a liquid (e.g. water) leak. In one example, helium is supplied to the inlet of the divertor at a pressure of 10 MPa and at a temperature of from 100 degrees Celsius to 600 degrees Celsius.

Although the present disclosure has focused on cooling of divertors, the described method of cooling and the arrangement of the various channels within a component can also be applied to cool other plasma-facing components within tokamaks (or other types of plasma chamber), such as limiters or first wall tiles (or panels). It can also be applied to components that are not part of a plasma chamber or tokamak, such as rocket engines or beam dumps, e.g. beam dumps for high-powered lasers or charged particle beams, in which the beam-facing surface of the beam dump is equivalent to the plasma-facing surface of the divertor. Thus a divertor as described herein can also be used as an accelerator beam dump or laser beam dump.

Whilst the present disclosure as exemplified by the above discussion has focused on the use of the divertor in a tokamak it could also be used in other types of plasma chamber, such as stellarators.

While various embodiments of the present invention have been described above, it should be understood that they have been presented by way of example, and not limitation. It would be apparent to one skilled in the relevant art(s) that various changes in form and detail could be made therein without departing from the spirit and scope of the invention.

The invention claimed is:

1. A plasma-facing component for a plasma chamber, comprising:
a plasma-facing target surface;
an inlet through which to receive a coolant fluid and an outlet through which to expel the coolant fluid; and
a plurality of internal cooling channels, each cooling channel being connected to the inlet by a plurality of feed channels and to the outlet by a plurality of return channels, the feed channels being configured to direct coolant fluid against a region of a wall of the cooling channel, respective openings of the feed and return channels into the cooling channel being arranged in non-overlapping repeating units along a length of the cooling channel, each unit comprising openings of at least one feed channel and at least one return channel, the feed channels formed in a first layer and the return channels formed in a second adjacent layer.

2. A plasma-facing component according to claim 1, wherein the repeating units are pairs of the feed and return channel openings.

3. A plasma-facing component according to claim 2, wherein a spacing along the length of the cooling channel between the openings of successive feed channels is from 1.0 mm to 5.0 mm, preferably from 2.0 mm to 4.0 mm.

4. A plasma-facing component according to claim 1, wherein a spacing along the length of the cooling channel between the openings of adjacent feed and return channels is from 0.50 mm to 2.00 mm.

5. A plasma-facing component according to claim 1, wherein each of the feed channels and/or the return channels comprises a straight portion that joins the cooling channel at a right angle.

6. A plasma-facing component according to claim 1, wherein the coolant fluid is directed on to the region of the wall of each cooling channel from another region of the cooling channel opposite the region.

7. A plasma-facing component according to claim 1, wherein the region of the wall of each of the cooling channels onto which the coolant fluid is directed is provided on a side of the cooling channel adjacent to the target surface.

8. A plasma-facing component according to claim 1, wherein each cooling channel has a width or diameter that is greater than a width or diameter of the corresponding feed and/or return channels.

9. A plasma-facing component according to claim 1, wherein the respective feed channels or the respective return channels for each of the cooling channels are co-planar with one another.

10. A plasma-facing component according to claim 1, and comprising a plurality of stacked layers, each of the cooling channels extending continuously through the layers, each layer comprising respective feed channels and/or return channels for each of the cooling channels.

11. A plasma-facing component according to claim 10, wherein the plasma-facing target surface is provided by edges of the stacked layers.

12. A plasma-facing component according to claim 10, wherein the plasma-facing target surface is provided as a layer extending across edges of the stacked layers.

13. A plasma-facing component according to claim 10, wherein the feed channels and/or return channels of each layer are provided as grooves extending into the layer and another layer adjacent the layer extends across the grooves to seal them.

14. A plasma-facing component according to claim 10, wherein the feed channels and/or return channels of each layer are provided as through holes that extend through the layer and respective other layers on either side of the layer extends across the through holes to seal them.

15. A plasma-facing component according to claim 10, wherein the inlet and the outlet are provided as channels extending through each of the layers.

16. A plasma-facing component according to claim 10, wherein the cooling channels and the feed and return channels of each layer are provided in one of two arrangements that are mirror images of each other.

17. A plasma-facing component according to claim 10, wherein each of layers is a plate made of one or more metals or alloys.

18. A plasma-facing component according to claim 17, wherein opposing faces of the plates are bonded together by direct bonding.

19. A plasma-facing component according to claim 17, wherein the or each metal or alloy has a melting point greater than 1850 degrees Celsius, preferably greater than 2200 degrees Celsius.

20. A plasma-facing component according to claim 1, provided as a monolithic part made of a metal or alloy.

21. A plasma-facing component according to claim 1, the component being one of a divertor, a limiter and a plasma-facing first wall structure, such as a first wall tile or panel.

22. A method of manufacturing a plasma-facing component for a plasma chamber, the method comprising controlling a manufacturing apparatus to manufacture the component of claim 1.

23. A computer program comprising computer executable instructions that, when executed by a processor, cause the processor to control a manufacturing apparatus to manufacture the plasma-facing component of claim 1.

24. A tokamak plasma chamber comprising a plasma-facing component of claim 1.

25. A method of removing heat and/or waste products during operation of a plasma chamber according to claim 24, the method comprising:
  magnetically confining a plasma within the tokamak plasma chamber;
  directing ions from the plasma onto the target surface of the plasma-facing component; and
  cooling the plasma-facing component by flowing coolant fluid through the plasma-facing component, between the inlet and the outlet.

26. A beam dump for absorbing energy from a beam of photons and/or charged particles, the beam dump comprising:
  a beam-facing target surface for receiving the beam;
  an inlet through which to receive a coolant fluid and an outlet through which to expel the coolant fluid; and
  a plurality of internal cooling channels, each cooling channel being connected to the inlet by a plurality of feed channels and to the outlet by a plurality of return channels, the feed channels being configured to direct coolant fluid against a region of a wall of the cooling channel, respective openings of the feed and return channels into the cooling channel being arranged in non-overlapping repeating units along a length of the cooling channel, each unit comprising openings of at least one feed channel and at least one return channel, the feed channels formed in a first layer and the return channels formed in a second adjacent layer.

27. A rocket engine comprising:
internal walls defining a combustion chamber for the combustion of a propellant; a nozzle through which to expel exhaust gases from the combustion chamber;
an inlet through which to receive a coolant fluid and an outlet through which to expel the coolant fluid; and
a plurality of internal cooling channels for cooling the walls defining the combustion chamber and/or the nozzle, each cooling channel being connected to the inlet by a plurality of feed channels and to the outlet by a plurality of return channels, the feed channels being configured to direct coolant fluid against a region of a wall of the cooling channel, respective openings of the feed and return channels into the cooling channel being arranged in overlapping repeating units along a length of the cooling channel, each unit comprising openings of at least one feed channel and at least one return channel, the feed channels formed in a first layer and the return channels formed in a second adjacent layer.

* * * * *